United States Patent
Patil et al.

(10) Patent No.: US 9,462,628 B2
(45) Date of Patent: Oct. 4, 2016

(54) APPARATUS AND METHOD FOR MAINTAINING A CIRCUIT-SWITCHED VOICE CALL IN A MULTI-RAB WIRELESS COMMUNICATION SYSTEM IN AN AREA OF WEAK COVERAGE

(75) Inventors: Kiran Patil, San Diego, CA (US); Sathish Krishnamoorthy, Hyderabad (IN); Suresh Sanka, Hyderabad (IN); Vinoth Palaniappan, Chennai (IN); Chetan Gopalakrishnan Chakravarthy, San Diego, CA (US); Sitaramanjaneyulu Kanamarlapudi, San Diego, CA (US); Rajiv R. Nambiar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 579 days.

(21) Appl. No.: 13/484,645

(22) Filed: May 31, 2012

(65) Prior Publication Data

US 2013/0016601 A1     Jan. 17, 2013

Related U.S. Application Data

(60) Provisional application No. 61/506,329, filed on Jul. 11, 2011.

(51) Int. Cl.
*H04W 76/04* (2009.01)
*H04W 40/00* (2009.01)
(Continued)

(52) U.S. Cl.
CPC ......... *H04W 76/064* (2013.01); *H04W 76/025* (2013.01); *H04W 76/027* (2013.01); *H04W 76/028* (2013.01); *H04W 76/045* (2013.01)

(58) Field of Classification Search
CPC ........... H04W 76/025; H04W 76/027; H04W 76/028; H04W 76/045; H04W 76/064
USPC ....................................................... 370/216
See application file for complete search history.

(56) References Cited

U.S. PATENT DOCUMENTS

| 7,301,918 B2 | 11/2007 | Echavarri et al. |
| 2003/0207702 A1 | 11/2003 | Chen |

(Continued)

FOREIGN PATENT DOCUMENTS

| EP | 1408658 A2 | 4/2004 |
| JP | 2004166198 A | 6/2004 |

(Continued)

OTHER PUBLICATIONS

3GPP TS 25.331 v10.5.0 (Sep. 2011), 3rd Generation Partnership Project; Technical Specification Group Radio Access Network; Radio Resource Control (RRC); Protocol specification (Release 10).

(Continued)

*Primary Examiner* — Awet Haile
(74) *Attorney, Agent, or Firm* — Darren M. Simon

(57) ABSTRACT

An apparatus and a method are provided for improving user experience in a multi-radio access bearer (multi-RAB) wireless communication system. After a user equipment establishes a circuit-switched communication link and a packet-switched communication link with a core network, it may receive an indication of an error associated with the packet-switched communication link. Here, if the value of a timer such as the RAB re-establishment timer T314 has a predetermined value (e.g., 0), the user equipment may release the packet-switched communication link, and maintain the circuit-switched communication link. The packet-switched communication link may then be re-established. In this fashion, errors that may occur on the data call need not interrupt a voice call.

28 Claims, 8 Drawing Sheets

(51) Int. Cl.
*H04W 76/06* (2009.01)
*H04W 76/02* (2009.01)

(56) References Cited

U.S. PATENT DOCUMENTS

| | | | |
|---|---|---|---|
| 2009/0196167 A1* | 8/2009 | Hu | 370/216 |
| 2011/0149853 A1 | 6/2011 | Olsson et al. | |
| 2011/0158140 A1 | 6/2011 | Asokan | |
| 2011/0217969 A1 | 9/2011 | Spartz et al. | |
| 2011/0286387 A1 | 11/2011 | Sane et al. | |
| 2013/0003523 A1* | 1/2013 | Singh | H04L 1/1867 370/216 |

FOREIGN PATENT DOCUMENTS

| | | |
|---|---|---|
| RU | 2173028 C2 | 8/2001 |
| RU | 2189072 C2 | 9/2002 |
| RU | 2334372 C2 | 9/2008 |
| WO | 9714238 A1 | 4/1997 |
| WO | 9728505 A1 | 8/1997 |
| WO | 03003767 A1 | 1/2003 |
| WO | 2005112500 A1 | 11/2005 |
| WO | 2009026586 A2 | 2/2009 |

OTHER PUBLICATIONS

International Search Report and Written Opinion—PCT/US2012/046092—ISA/EPO—Oct. 9, 2012.

Lin, et al., "Bearer Reservation with Preemption for Voice Call Continuity," IEEE Transactions on Wireless Communications, vol. 8, No. 5, May 2009, pp. 2716-2725.

Renesas Mobile Europe LTD: "Cell update-less RLC/PDCP unrecoverable error recovery",3GPP Draft; R2-113178, 3rd Generation Partnership Project (3GPP), Mobile Competence Centre ; 650, Route Deslucioles ; F-06921 Sophia-Antipolis Cedex ; France, vol. RAN WG2, No., Barcelona, Spain; May 9, 2011, May 1, 2011, XP050495010, [retrieved on May 1, 2011] the whole document.

Renesas Mobile Europe LTD: "Introduction of cell update-less RLC/PDCP unrecoverable error recovery", 3GPP Draft; 25331_CRXXXX (REL-10) R2-113180, 3rd Generation Partnership Project (3GPP), Mobile Competence Centre; 650, Route Deslucioles; F-06921 Sophia-Antipolis Cedex; France, vol. RAN WG2, No. Barcelona, Spain; May 9, 2011, May 1, 2011, XP050495004, [retrieved on May 1, 2011].

* cited by examiner

APPARATUS AND METHOD FOR MAINTAINING A CIRCUIT-SWITCHED VOICE CALL IN A MULTI-RAB WIRELESS COMMUNICATION SYSTEM IN AN AREA OF WEAK COVERAGE

CROSS-REFERENCE TO RELATED APPLICATIONS

This application claims priority to and the benefit of provisional patent application No. 61/506,329, entitled "SYSTEMS AND METHODS FOR MAINTAINING A COMMUNICATION LINK", filed in the United States Patent and Trademark Office on Jul. 11, 2011, the entire content of which is incorporated herein by reference.

TECHNICAL FIELD

Aspects of the present disclosure relate generally to wireless communication systems, and more particularly, to signaling messages in a multi-RAB wireless communication system capable of a concurrent circuit-switched voice communication link and packet-switched data communication link.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

In a multi-radio access bearer (multi-RAB) system, a mobile user equipment may be capable of maintaining concurrent communication links over a circuit-switched protocol and a packet-switched protocol. As the demand for mobile broadband access continues to increase, research and development continue to advance the UMTS technologies not only to meet the growing demand for mobile broadband access, but to advance and enhance the user experience with mobile communications. In particular, as advancements in communication technology continue to improve capabilities and data rates for packet-switched data calls, there is a desire to at least maintain, if not improve, the quality of circuit-switched voice calls.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of wireless communication operable at a user equipment. Here, the method includes establishing a circuit-switched communication link with a core network, establishing a packet-switched communication link with the core network, and receiving an indication of an error associated with the packet-switched communication link. Further, if a value of a timer corresponds to a predetermined value, the method further includes releasing the packet-switched communication link and maintaining the circuit-switched communication link when the packet-switched communication link is released.

Another aspect of the disclosure provides a user equipment (UE) configured for wireless communication. Here, the UE includes means for establishing a circuit-switched communication link with a core network, means for establishing a packet-switched communication link with the core network, means for receiving an indication of an error associated with the packet-switched communication link, and means for, if a value of a timer corresponds to a predetermined value, releasing the packet-switched communication link, and maintaining the circuit-switched communication link when the packet-switched communication link is released.

Another aspect of the disclosure provides a UE configured for wireless communication, including at least one processor, a communication interface coupled to the at least one processor, and a memory coupled to the at least one processor. Here, the at least one processor is configured to establish a circuit-switched communication link with a core network, to establish a packet-switched communication link with the core network, and to receive an indication of an error associated with the packet-switched communication link. If a value of a timer corresponds to a predetermined value, the at least one processor is further configured to release the packet-switched communication link, and to maintain the circuit-switched communication link when the packet-switched communication link is released.

Another aspect of the disclosure provides a computer program product operable at a UE, including a computer-readable storage medium having instructions for causing a computer to establish a circuit-switched communication link with a core network, instructions for causing a computer to establish a packet-switched communication link with the core network, instructions for causing a computer to receive an indication of an error associated with the packet-switched communication link, and instructions for causing a computer, if a value of a timer corresponds to a predetermined value, to release the packet-switched communication link, and to maintain the circuit-switched communication link when the packet-switched communication link is released.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
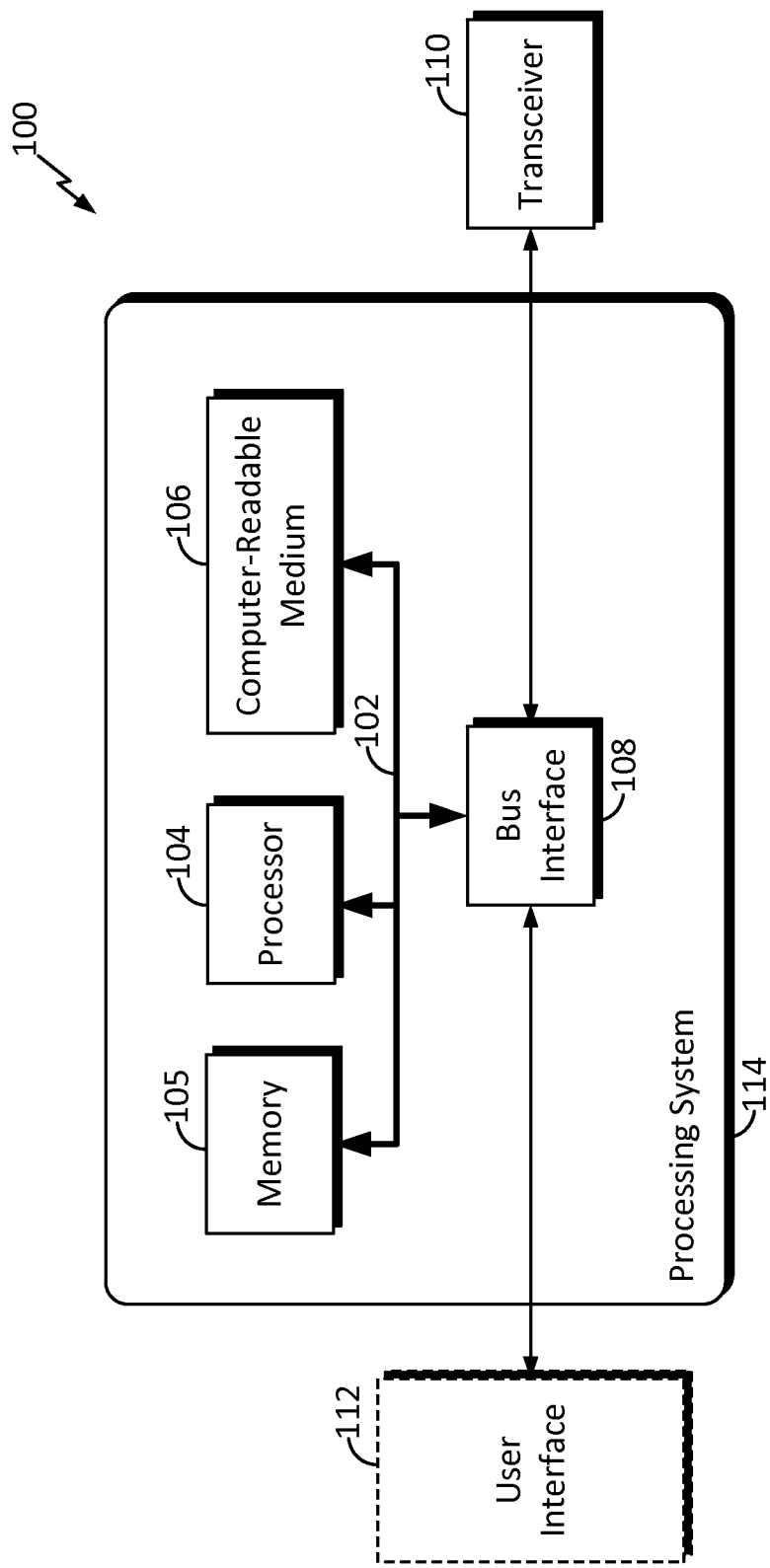
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
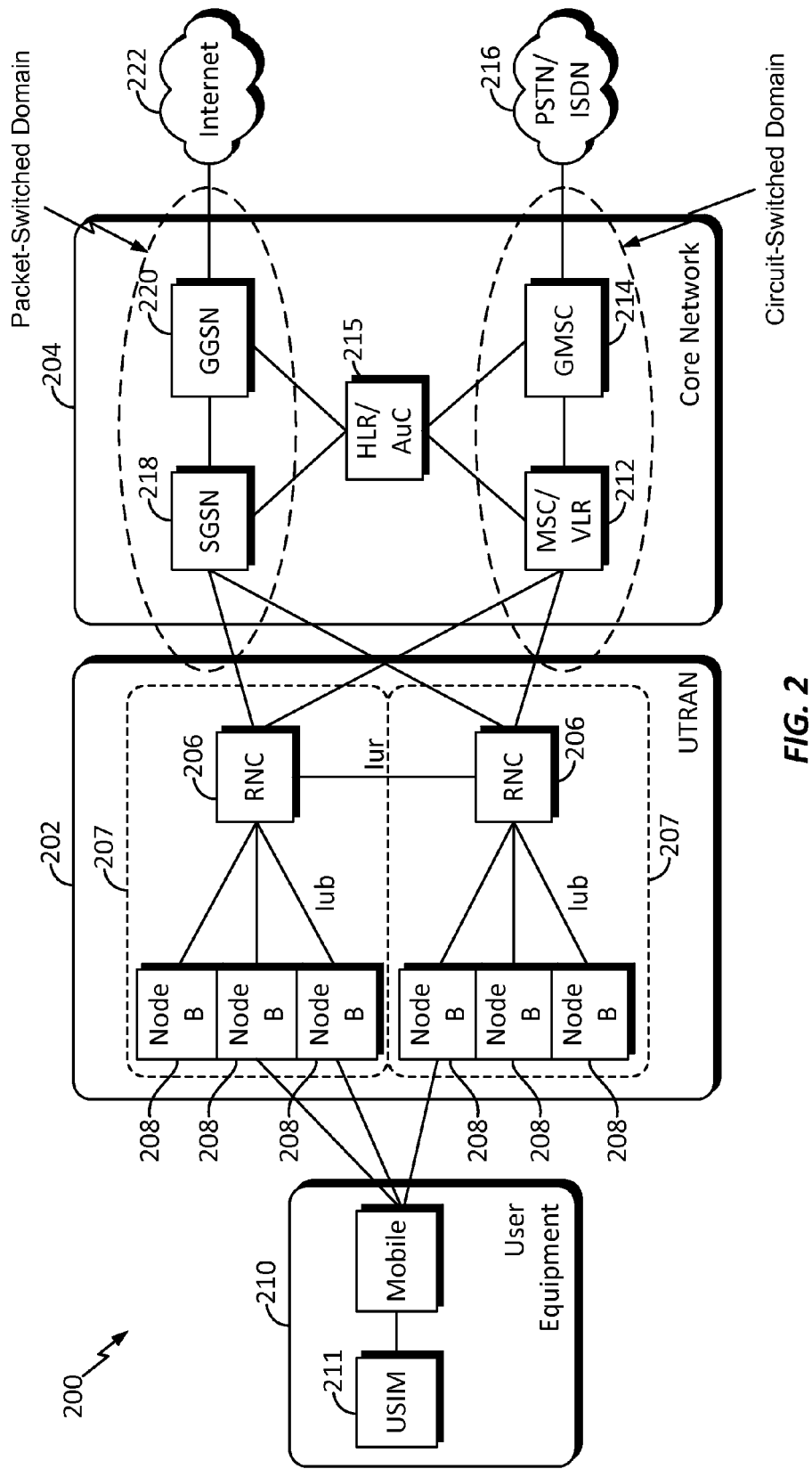
FIG. 2 is a block diagram conceptually illustrating an example of a telecommunications system.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a core network 204, a radio access network (RAN) (e.g., the UMTS Terrestrial Radio Access Network (UTRAN) 202), and a user equipment (UE) 210. The UTRAN 202 provides radio access bearers (RABs) for communication between the UE 210 and the core network 204. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. For example, the RNC 206, when it is a serving RNC for a UE, performs the L2 processing of data over the air interface. For example, the serving RNC may perform basic radio resource management operations such as the mapping of radio access bearer (RAB) parameters into air interface transport channel parameters, making handover decisions, performing outer loop power control, etc.

The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

Figure 3:
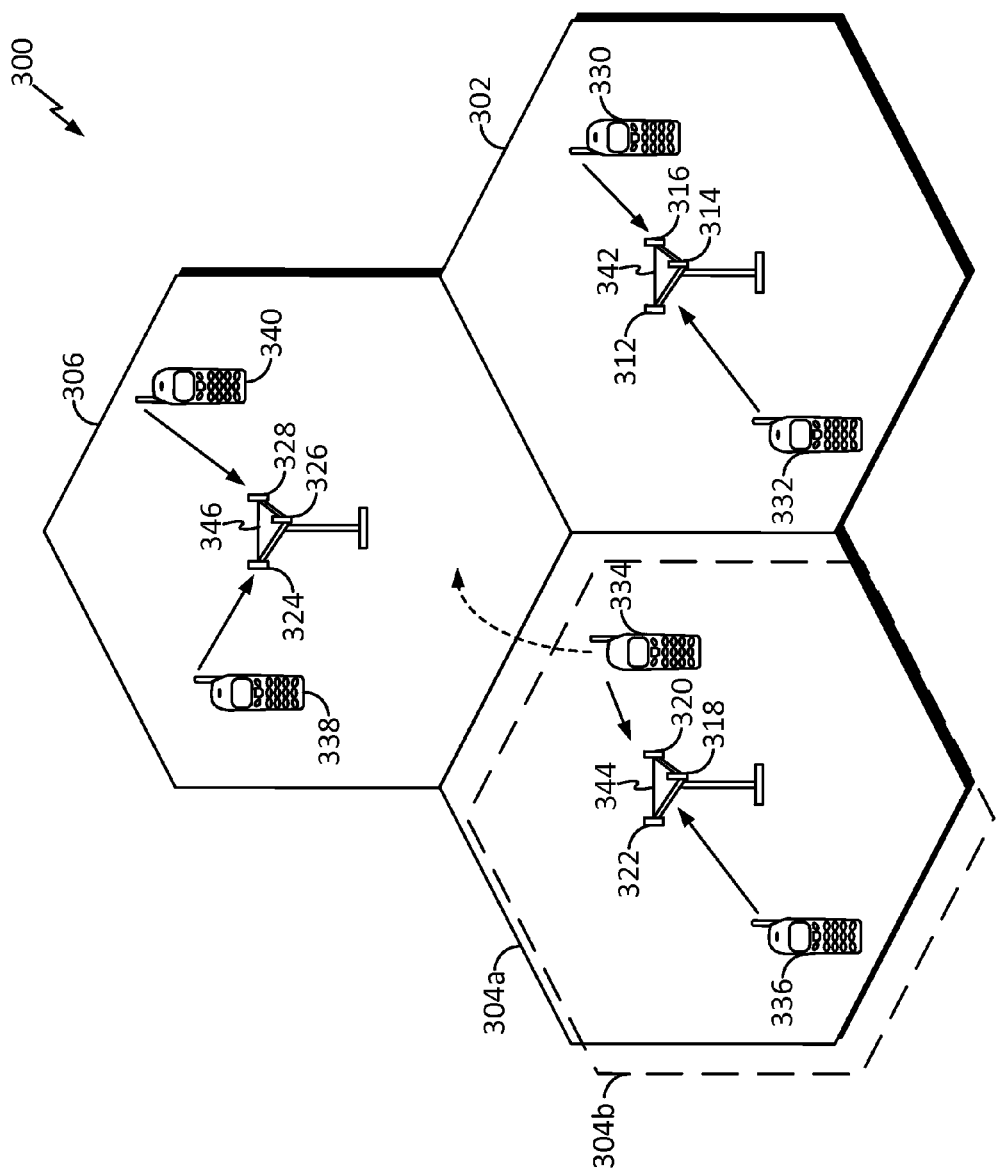
FIG. 3 is a conceptual diagram illustrating an example of an access network.

The UTRAN 202 is one example of a RAN that may be utilized in accordance with the present disclosure. Referring to FIG. 3, by way of example and without limitation, a simplified schematic illustration of a RAN 300 in a UTRAN architecture is illustrated. The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UEs 334 and 336 may be in communication with Node B 344, and UEs 338 and 340 may be in communication with Node B 346. Here, each Node B 342, 344, and 346 may be configured to provide an access point to a core network 204 (see FIG. 2) for all the UEs 330, 332, 334, 336, 338, and 340 in the respective cells 302, 304, and 306.

During a call with a source cell, or at any other time, the UE 336 may monitor various parameters of the source cell as well as various parameters of neighboring cells. Further, depending on the quality of these parameters, the UE 336 may maintain communication with one or more of the neighboring cells. During this time, the UE 336 may maintain an Active Set, that is, a list of cells to which the UE 336 is simultaneously connected (i.e., the UTRAN cells that are currently assigning a downlink dedicated physical channel DPCH or fractional downlink dedicated physical channel F-DPCH to the UE 336 may constitute the Active Set).

A high speed packet access (HSPA) air interface includes a series of enhancements to the 3G/W-CDMA air interface between the UE 210 and the UTRAN 202, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

For example, in Release 5 of the 3GPP family of standards, HSDPA was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-SCCH is a physical channel that may be utilized to carry downlink control information related to the transmission of HS-DSCH. Here, the HS-DSCH may be associated with one or more HS-SCCH. The UE may continuously monitor the HS-SCCH to determine when to read its data from the HS-DSCH and to determine the modulation scheme used on the assigned physical channel.

The HS-PDSCH is a physical channel that may be shared by several UEs and may carry downlink data for the high-speed downlink. The HS-PDSCH may support quadrature phase shift keying (QPSK), 16-quadrature amplitude modulation (16-QAM), and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 210 and the core network 204 (referring to FIG. 2), and may include circuit-switched and packet-switched protocols. The AS provides the lower layers, for signaling between the UTRAN 202 and the UE 210, and may include a user plane and a control plane. Here, the user plane or data plane carries user traffic, while the control plane carries control information (i.e., signaling). That is, the user plane carries user data related to radio access bearers, while the control plane includes the Application Protocol and the Signaling Bearer to transport the Application Protocol messages. Here, the Application Protocol may be utilized to set up the bearers to the UE 210 (e.g., the radio access bearers and the Radio Link).

At the upper layers, the NAS may provide for connection management, handling circuit-switched calls and including sublayers responsible for call control (e.g., establish and release), supplementary services (e.g., call forwarding and 3-way calling), and short message service (SMS). Furthermore, the NAS may provide for session management, handling packet-switched calls (e.g., establish and release). Still further, the NAS may provide for mobility management, handling location updating and authentication for packet-switched calls. Moreover, the NAS may provide for GPRS mobility management, handling location updating and authentication for packet-switched calls. Thus, between the UTRAN 202 and the core network 204, in some examples, one radio access bearer (RAB) may carry information relating to a circuit-switched voice call, and another RAB may carry information relating to a packet-switched data call.

Figure 4:
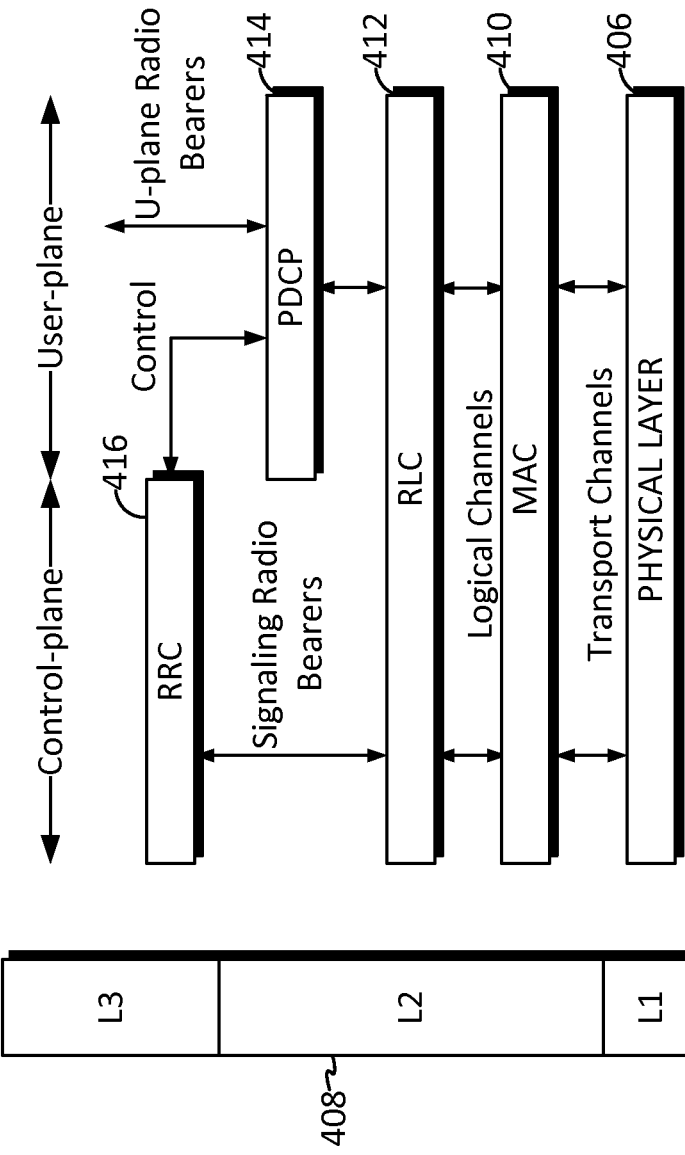
FIG. 4 is a conceptual diagram illustrating an example of a radio protocol architecture for the user and control plane.

Turning to FIG. 4, the AS is shown with three layers: Layer 1, Layer 2, and Layer 3. Layer 1 is the lowest layer and implements various physical layer signal processing functions. Layer 1 will be referred to herein as the physical layer 406. The data link layer, called Layer 2 408, is above the physical layer 406 and is responsible for the link between the UE 210 and Node B 208 over the physical layer 406.

At Layer 3, the RRC layer 416 handles the control plane signaling between the UE 210 and the RNC 206. RRC layer 416 includes a number of functional entities for routing higher layer messages, handling broadcasting and paging functions, establishing and configuring radio bearers, etc.

The NAS may utilize certain services provided by the RRC layer 416, including initial direct transfer (IDT), downlink direct transfer (DDT), and uplink direct transfer (UDT). The IDT procedure may be utilized to establish a signaling connection, and to carry the initial NAS messages over the air interface. The DDT procedure may be utilized in the downlink direction to carry NAS messages over the radio interface. The UDT procedure may be utilized in the uplink direction to carry NAS messages over the radio interface belonging to a signaling connection. Here, in order for the DDT and UDT procedures to function, a signaling connection, established by the IDT procedure, is generally maintained at the RRC layer 416 until it is explicitly requested to close by the NAS.

In the illustrated air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE may have several upper layers above the L2 layer 408 including a network layer (e.g., IP layer) that is terminated at a PDN gateway on the network side and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between Node Bs.

The RLC sublayer 412 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

Figure 5:
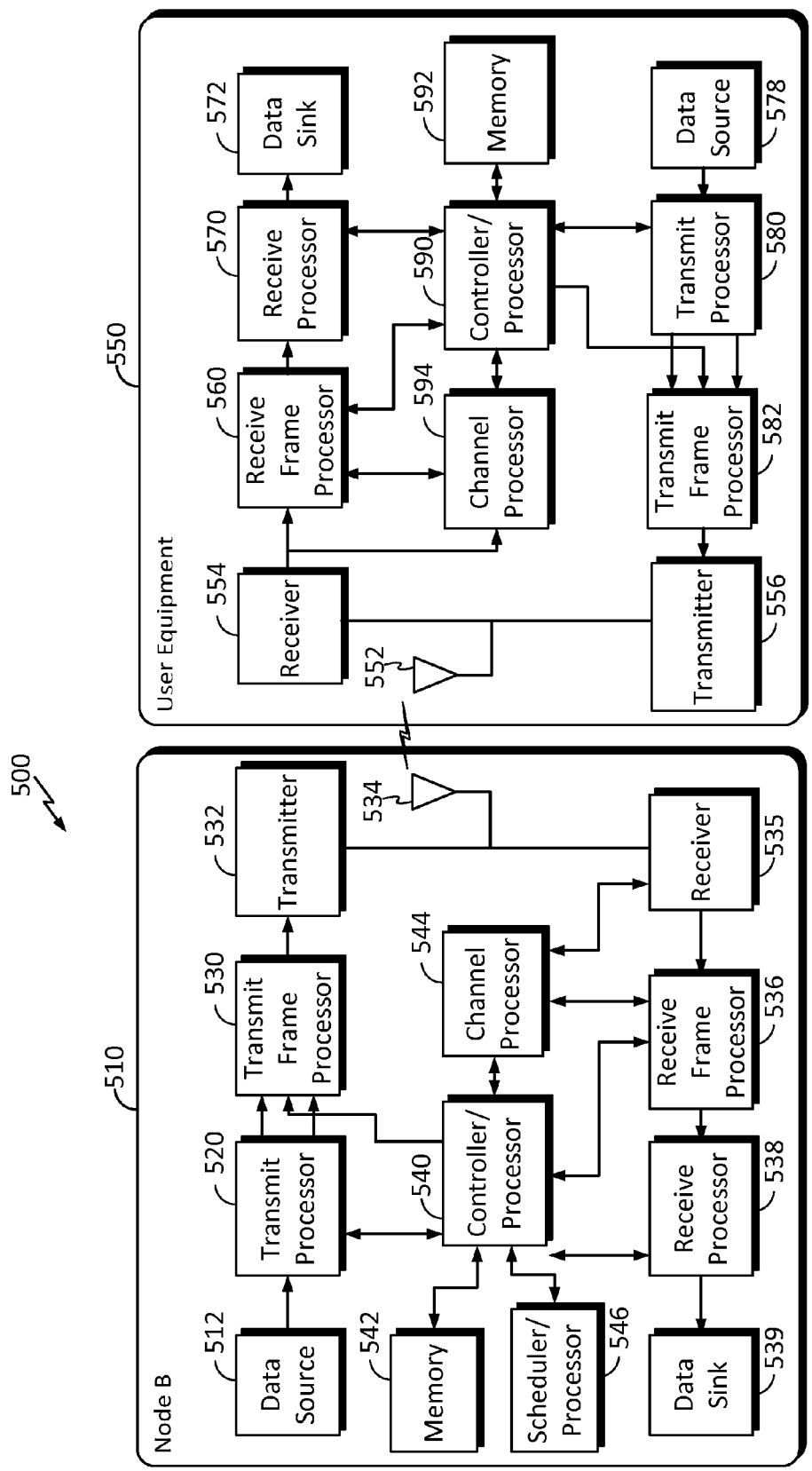
FIG. 5 is a block diagram conceptually illustrating an example of a Node B in communication with a UE in a telecommunications system.

FIG. 5 is a block diagram of an exemplary Node B 510 in communication with an exemplary UE 550, where the Node B 510 may be the Node B 208 in FIG. 2, and the UE 550 may be the UE 210 in FIG. 2. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

In accordance with various aspects of the present disclosure, a method for reducing or avoiding dropped circuit-switched voice calls, which might otherwise be caused by problems occurring in a concurrent packet-switched data call. In some examples, the method may be implemented by a UE 550; a UE 210; a processing system 114; or by any other suitable means for implementing the described functions.

Figure 6:
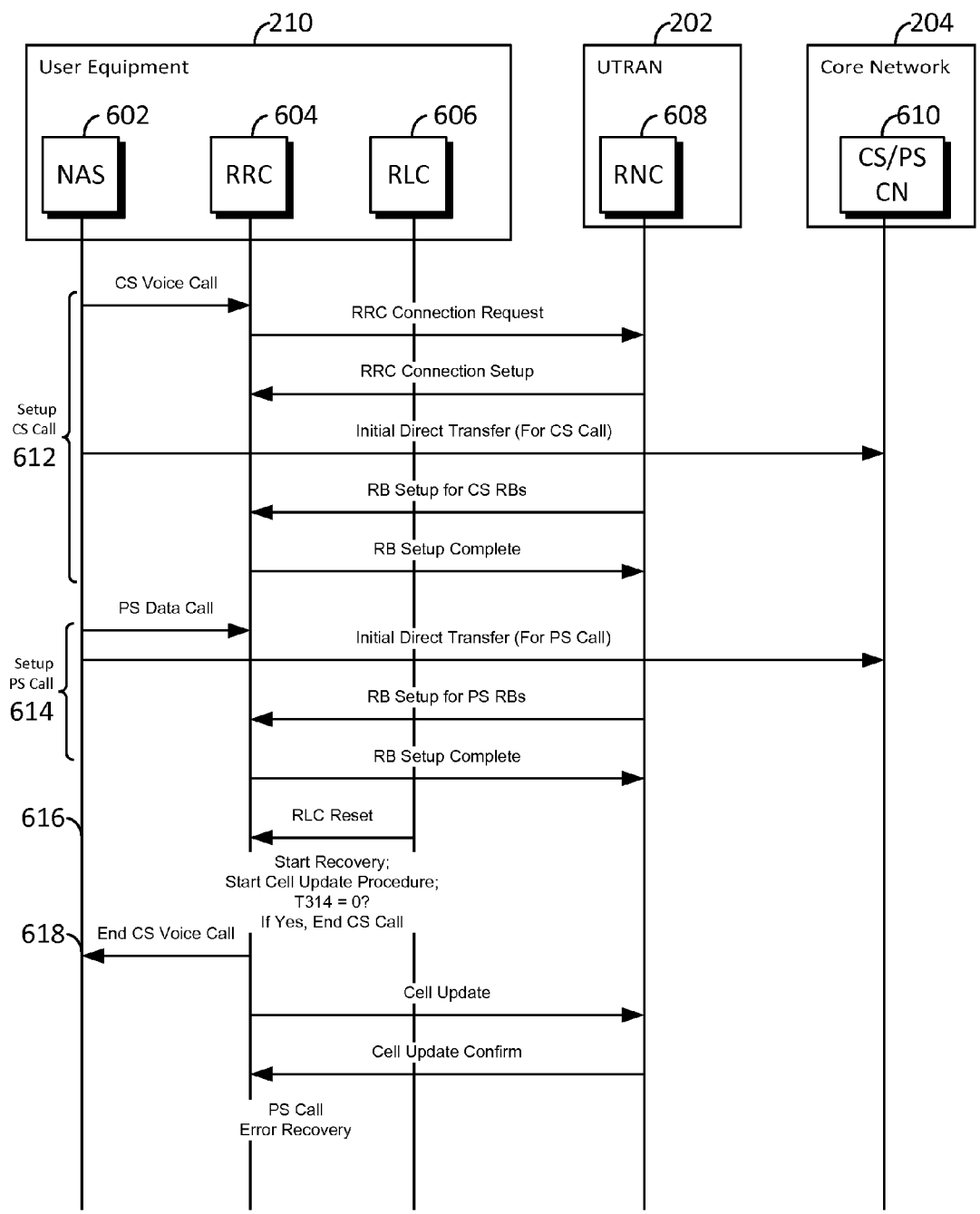
FIG. 6 is a call flow diagram illustrating a conventional multi-RAB process resulting in a dropped circuit-switched voice call.

For example, when a UE such as the UE 550 having plural RABs established between the UE 550 and the core network is in an area of weak signal coverage, an RLC error on one RAB carrying a packet-switched data call may lead to a drop of a circuit-switched voice call on a different, corresponding RAB. FIG. 6 illustrates one such scenario, wherein packet-switched radio bearers experience problems resulting in an RLC reset, triggering a recovery procedure called cell update or URA update. In this case, as described in further detail below, if a timer associated with the circuit-switched connection has a value corresponding to a predetermined value (e.g., if a RAB re-establishment timer associated with the circuit-switched communication link, e.g., designated T314 or T315 in 3GPP standards has a value configured as zero), then responsive to the RLC reset condition, the UE 550 may drop the voice call by disconnecting the RAB corresponding to the circuit-switched connection. This can be inconvenient for the user, since the continuity of the voice call may be a relatively high priority, while the packet-switched data call might not be carrying such high priority or time-critical information. Such a user may prefer to maintain the voice call in spite of the error on the data call, releasing only the data call and optionally, subsequently re-establishing the packet-switched data call.

Referring now to FIG. 6, a call flow diagram 600 is illustrated to show a conventional process of wireless communication that may result in a dropped voice call. The illustrated process is shown to involve a UE 210, a UTRAN 202, and a core network 204. In various examples according to aspects of the present disclosure, the UE 210 may correspond to the UE 550 illustrated in FIG. 5, and additionally or alternatively, may include a processing system 114 as illustrated in FIG. 1. In other examples, the UE 210 may be replaced by any suitable means for performing the functions recited below. Here, the UE 210 is illustrated to include NAS circuitry 602, RRC circuitry 604, and RLC circuitry 606. In some examples these circuitry blocks 602, 604, and 606 may represent respective physical circuits within the UE 210; in some examples these circuitry blocks 602, 604, and 606 may be functional blocks implemented in software, e.g., stored in a memory 105 and executed by a general-purpose processor 104 (see FIG. 1).

Similarly, the UTRAN 202 in FIG. 6 is shown to include an RNC 608. In some examples, the RNC 608 may correspond to the RNC 206 illustrated in FIG. 1. Furthermore, the core network 204 is shown to include circuit-switched/packet-switched core network circuitry 610. In some examples, the circuitry 610 may correspond to one or more of the SGSN 218, the GGSN 220, the HLR/AuC 215, the MSC/VLR 212, and/or the GMSC 214 illustrated in FIG. 2.

To establish a circuit-switched communication link between the UE 210 and the core network 204, a wireless communication system may utilize a procedure (e.g., the Setup CS Call procedure 612) to set up a circuit-switched call. Here, the NAS circuitry 602 may request for an RRC connection to be established. To this end, at the RRC layer 416, the RRC circuitry 604 at the UE 210 may communicate with corresponding RRC circuitry at the RNC 608 utilizing an RRC Connection Request Message and a responsive RRC Connection Setup Message, to establish the RRC connection and the corresponding wireless link. After the establishment of the wireless connection between the UE 210 and the UTRAN 202, an Initial Direct Transfer message may be transmitted from the NAS circuitry 602 to the core network 204 to indicate the type of call, the type of radio bearers needed for that call, and a UE identity. Thereafter, the RRC circuitry 604 at the UE 210 and the RNC 608 may establish radio bearers to carry the user data for the circuit-switched voice call utilizing corresponding RB setup messages.

Similarly, to establish a packet-switched communication link between the UE 210 and the core network 204, the wireless communication system may utilize a procedure (e.g., the Setup PS Call procedure 614) to set up a packet-switched call. In the illustrated example, an RRC connection has been established during the CS call setup procedure 612, and thus, the PS call setup procedure 614 may transmit an Initial Direct Transfer message for the PS call from the NAS circuitry 602 to the core network 610. Thereafter, the RRC circuitry 604 at the UE 210 and the RNC 608 may establish radio bearers to carry the user data for the packet-switched data call utilizing corresponding RB setup messages.

In the illustrated process, at the time designated by 616, an error occurs on the packet-switched data call triggering an RLC reset procedure. In various examples within the scope of the present disclosure, any of numerous different types of errors may result in such a reset procedure, such as in one nonlimiting example, a packet error resulting from the UE 210 falling into an area of weak wireless coverage. When the reset procedure occurs, a recovery procedure, which may be referred to as a cell update or URA update procedure, may begin.

As described above, in many conventional networks currently deployed, the value of the RAB re-establishment timer T314 or T315, which is associated with the circuit-switched voice call, may be preconfigured with a value of zero. In the description that follows, while the RAB re-establishment timer T314 is described as one example, those of ordinary skill in the art will understand that other examples within the scope of the present disclosure may utilize the T315 timer associated with the circuit-switched communication link. According to current standards, i.e., 3GPP TS 25.331, sections 8.1.14 and 8.3.1.2 (incorporated herein by reference), there exists a radio access bearer (RAB) re-establishment timer, e.g., called the T314 timer. The RAB re-establishment timer T314 may be associated with the circuit-switched voice call. According to these standards, responsive to the RLC reset indication resulting from packet failures associated with a packet-switched connection, during the cell update procedure the UE 210 determines if the value of the RAB re-establishment timer is equal to zero. If so, the standard indicates to release all connections associated with the RAB re-establishment timer, which includes the circuit-switched voice connection.

Thus, as part of the RLC reset procedure, and responsive to the determination that the value of the RAB re-establishment timer is equal to zero, at 618 the conventional procedure ends the circuit-switched voice call.

Figure 7:
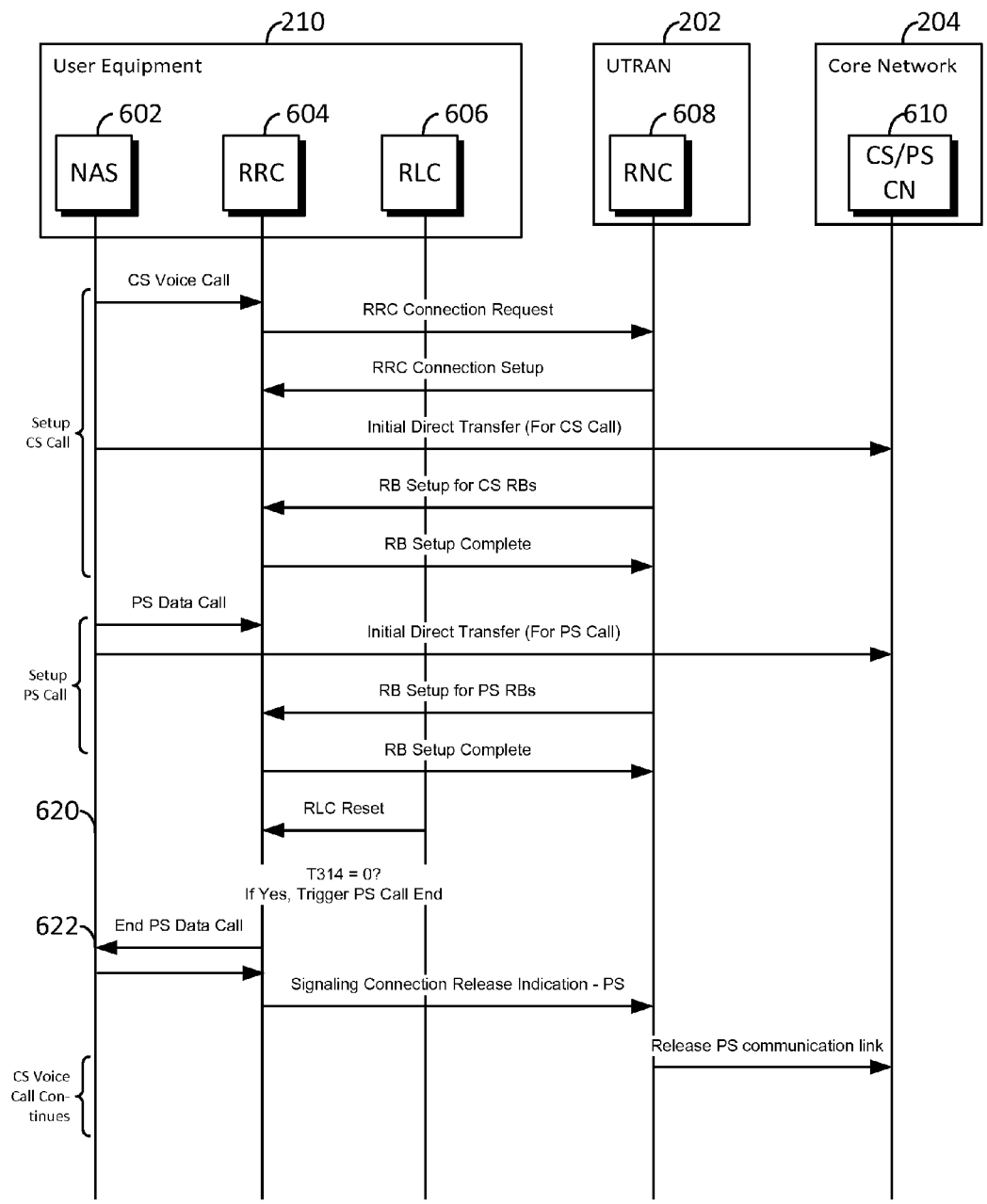
FIG. 7 is a call flow diagram illustrating a multi-RAB process according to one example.

In accordance with an aspect of the present disclosure, the release of the circuit-switched voice call during the cell update procedure may be avoided even though the value of the RAB re-establishment timer associated with the circuit-switched communication link has a value equal to zero. FIG. 7 is a call flow diagram illustrating an exemplary procedure according to one aspect of the present disclosure wherein a Signaling Connection Release Indication message for ending the packet-switched data call is triggered, while maintaining the circuit-switched voice call. The Signaling Channel Release Indication message is a conventional message typically utilized by a UE to release a connection when the UE is powered off or when an error at the NAS level has occurred.

In the process shown in FIG. 7, a circuit-switched voice call and a packet-switched data call are established in the same way as described above in relation to FIG. 6, and so these steps are not duplicated here. Furthermore, similar to the process described above in relation to FIG. 6, an error may occur in relation to the packet-switched data call, triggering an RLC Reset signal at 620 in FIG. 7. Responsive to an error associated with the packet-switched communication link, a cell update procedure may commence, during which the UE 210 (e.g., at the RRC circuitry 604) may determine whether the value of the RAB re-establishment timer has a value equal to zero. However, in an aspect of the present disclosure, if the value of the RAB re-establishment timer has a value equal to zero, the RRC circuitry 604 may notify the NAS circuitry 602, such that the NAS circuitry 602 may thereby request the RRC circuitry 604 to release the packet-switched communication link, such that the circuit-switched communication link can be maintained. Thus, the RRC circuitry 604 may transmit a signaling connection release indication message corresponding to the packet-switched domain at the core network circuitry 610, resulting in the core network 204 releasing the packet-switched communication link. In this way, the circuit-switched communication link may be maintained when the packet-switched communication link is released.

Following the release of the packet-switched communication link, a new packet-switched communication link may be established in a similar fashion as the initial packet-switched communication link was established as described above.

In this way, circuit-switched voice calls may be maintained when there is an error relating to a packet-switched data connection. Such a process can alleviate the current issue wherein the circuit-switched voice call is terminated when a packet-switched data connection causes an RLC reset.

Figure 8:
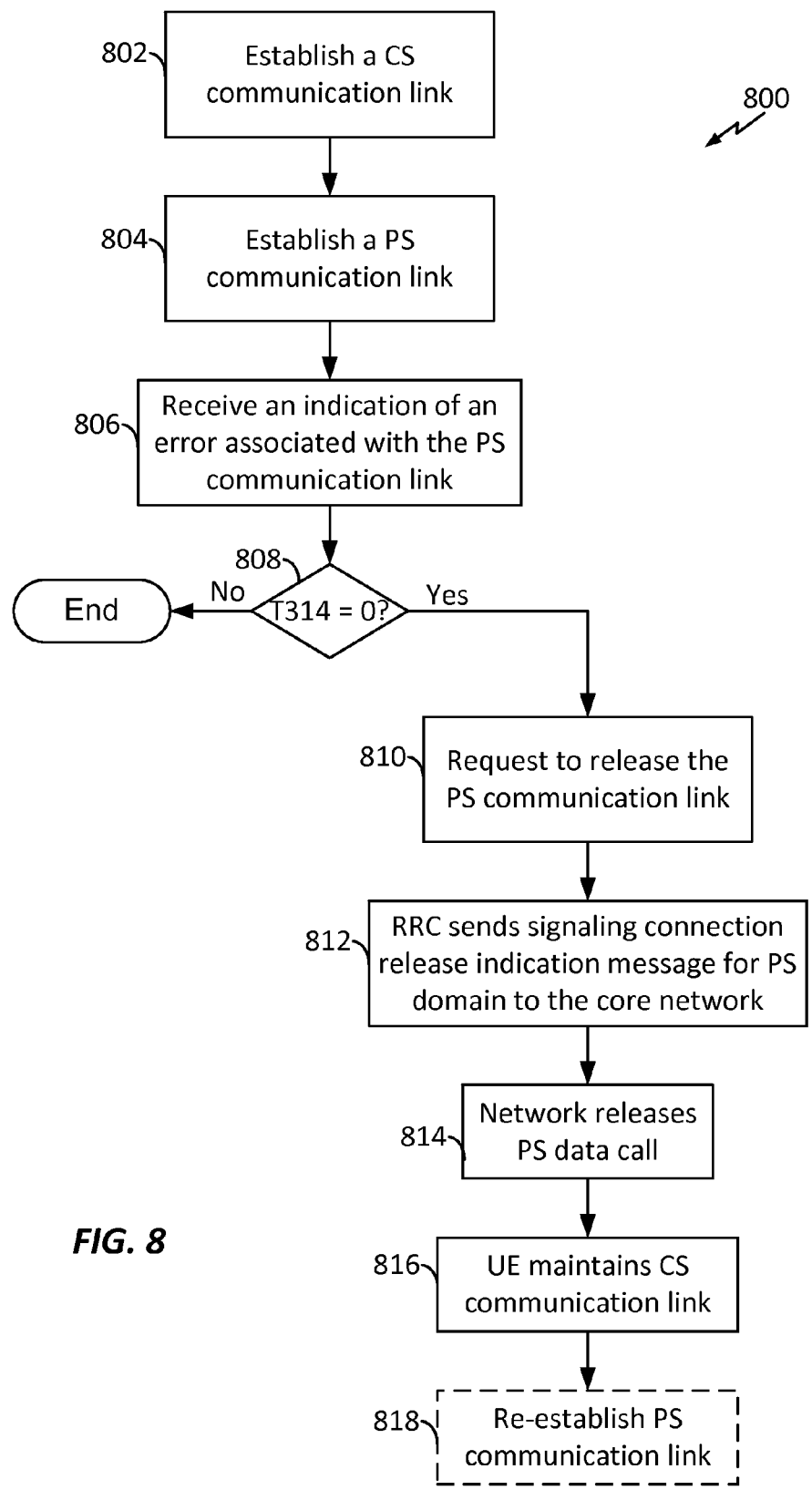
FIG. 8 is a flow chart illustrating a process of wireless communication according to one example.

FIG. 8 is a flow chart illustrating an exemplary process 800 of wireless communication in accordance with some aspects of the present disclosure, wherein a circuit-switched voice call may be maintained although an error on a concurrent packet-switched data call results in an RLC reset. In some examples the process may be implemented by a UE 210 or a UE 550. In other examples the process may be implemented by a processing system 114. In still other examples the process may be implemented by any suitable means for performing the recited functions.

In the illustrated process 800, at block 802 the UE 550 may establish a circuit-switched communication link with a core network 204; and at block 804 the UE 550 may establish a packet-switched communication link with the core network 204. For example, the UE 550 may transmit suitable signaling utilizing the transmitter 556 in coordination with the controller/processor 590 to establish the respective circuit-switched and packet-switched communication links.

At block 806, the RRC entity 604 at the UE 550 may receive an indication of an error associated with the packet-switched communication link. For example, a packet error may occur over the packet-switched data connection, resulting in an RLC reset. In some examples, the indication of the error may be received at the receiver 554, being transmitted to the UE 550 over the wireless communication link. In other examples, the indication of the error may be generated at the UE 550, e.g., at one or more of the RLC entity 606, the RRC entity 604, and/or the NAS entity 602, and the receiving of the indication of the error may occur at one of these respective entities, e.g., being sent from one layer to another. Here, the indication of the error, and the RLC reset procedure which may follow, may trigger a cell update or URA update procedure. During this procedure, at block 808, the UE 550 may determine if a value of a timer corresponding to the circuit-switched communication link (e.g., the RAB re-establishment timer T314 or T315, or whichever timer is configured to correspond to the circuit-switched communication link) corresponds to a predetermined value (e.g., zero). Here, the timer (e.g., the RAB re-establishment timer T314 or T315) may be a software construct stored in memory 592 within the UE 550 and/or within a memory at the RNC 206, utilized at the RRC layer 416. Additionally or alternatively, the timer may be any suitable timer known to those skilled in the art capable of performing a timing function.

In an aspect of the disclosure, the RAB re-establishment timer may be pre-configured with a default value, which may take any suitable value from zero (0) to some maximum time, e.g., 30 seconds. In many conventional wireless communication networks, the value of the RAB re-establishment timer for voice calls is pre-configured to a value of zero.

If in block 808 the UE 550 determines that the value of the timer does not correspond to the predetermined value (e.g., T314≠0), the process ends: for example, conventional procedures may proceed to handle the indication of error received in block 806. However, if in block 808 the UE 550 determines that the value of the timer corresponds to the predetermined value (e.g., T314=0), the process may proceed to block 810, wherein the UE 550 may request to release the packet-switched communication link. For example, the RRC entity 604 may utilize the transmitter 556 to transmit a signaling connection release indication to the RNC 608 to request the UTRAN 202 to release the packet-switched communication link. Thereafter, at block 814, the RNC 608 may release the packet-switched communication link with the core network 204.

At block 816, the UE 550 may maintain the circuit-switched communication link when the packet-switched communication link is released. That is, the circuit-switched communication link established at block 802 may be maintained despite the error associated with the packet-switched communication link, and the corresponding RLC reset.

Thereafter, optionally at block 818, the UE 550 may re-establish the packet-switched communication link while continuing to maintain the circuit-switched communication link. Here, the same or similar procedure described above in relation to block 804 may be utilized to re-establish the packet-switched communication link.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment, comprising:
    establishing a circuit-switched communication link with a core network;
    establishing a packet-switched communication link with the core network;
    receiving an indication of an error associated with the packet-switched communication link; and
    comparing a value of a radio access bearer (RAB) re-establishment timer with a predetermined value upon receiving the indication of the error associated with the packet-switched communication link,
    wherein, if the value of the RAB re-establishment timer is equal to the predetermined value, the method further comprises:
        in response to the indication of the error, ending a packet-switched data call at the user equipment prior to transmitting a signaling connection release indication message to release the packet-switched communication link; and
        maintaining the circuit-switched communication link when the packet-switched communication link is released.

2. The method of claim 1, further comprising:
    re-establishing the packet-switched communication link while maintaining the circuit-switched communication link.

3. The method of claim 1, wherein the RAB re-establishment timer is a RAB re-establishment timer T314.

4. The method of claim 3, wherein the predetermined value is 0.

5. The method of claim 1, wherein the RAB re-establishment timer is a RAB re-establishment timer T315.

6. The method of claim 5, wherein the predetermined value is 0.

7. The method of claim 1, further comprising:
    selecting as the RAB re-establishment timer a RAB re-establishment timer T314 if the RAB re-establishment timer T314 is configured for the circuit-switched communication link; and
    selecting as the RAB re-establishment timer a RAB re-establishment timer T315 if the RAB re-establishment timer T315 is configured for the circuit-switched communication link.

8. A user equipment configured for wireless communication, comprising:
    means for establishing a circuit-switched communication link with a core network;
    means for establishing a packet-switched communication link with the core network;
    means for receiving an indication of an error associated with the packet-switched communication link;
    means for comparing a value of a radio access bearer (RAB) re-establishment timer with a predetermined value upon receiving the indication of the error associated with the packet-switched communication link;
    means for, if the value of the RAB re-establishment timer is equal to the predetermined value, in response to the indication of the error, ending a packet-switched data call at the user equipment prior to transmitting a signaling connection release indication message to release the packet-switched communication link, and maintaining the circuit-switched communication link when the packet-switched communication link is released.

9. The user equipment of claim 8, further comprising:
    means for re-establishing the packet-switched communication link while maintaining the circuit-switched communication link.

10. The user equipment of claim 8, wherein the RAB re-establishment timer is a RAB re-establishment timer T314.

11. The user equipment of claim 10, wherein the predetermined value is 0.

12. The user equipment of claim 8, wherein the RAB re-establishment timer is a RAB re-establishment timer T315.

13. The user equipment of claim 12, wherein the predetermined value is 0.

14. The user equipment of claim 8, further comprising:
means for selecting as the RAB re-establishment timer a RAB re-establishment timer T314 if the RAB re-establishment timer T314 is configured for the circuit-switched communication link; and
means for selecting as the RAB re-establishment timer a RAB re-establishment timer T315 if the RAB re-establishment timer T315 is configured for the circuit-switched communication link.

15. A user equipment configured for wireless communication, comprising:
at least one processor;
a communication interface coupled to the at least one processor; and
a memory coupled to the at least one processor,
wherein the at least one processor is configured to:
establish a circuit-switched communication link with a core network;
establish a packet-switched communication link with the core network;
receive an indication of an error associated with the packet-switched communication link; and
compare a value of a radio access bearer (RAB) re-establishment timer with a predetermined value upon receiving the indication of the error associated with the packet-switched communication link,
wherein, if the value of the RAB re-establishment timer is equal to the predetermined value, the at least one processor is further configured to:
in response to the indication of the error, end a packet-switched data call at the user equipment prior to transmitting a signaling connection release indication message to release the packet-switched communication link; and
maintain the circuit-switched communication link when the packet-switched communication link is released.

16. The user equipment of claim 15, wherein the at least one processor is further configured to:
re-establish the packet-switched communication link while maintaining the circuit-switched communication link.

17. The user equipment of claim 15, wherein the RAB re-establishment timer is a RAB re-establishment timer T314.

18. The user equipment of claim 17, wherein the predetermined value is 0.

19. The user equipment of claim 15, wherein the RAB re-establishment timer is a RAB re-establishment timer T315.

20. The user equipment of claim 19, wherein the predetermined value is 0.

21. The user equipment of claim 15, wherein the at least one processor is further configured to:

select as the RAB re-establishment timer a RAB re-establishment timer T314 if the RAB re-establishment timer T314 is configured for the circuit-switched communication link; and
select as the RAB re-establishment timer a RAB re-establishment timer T315 if the RAB re-establishment timer T315 is configured for the circuit-switched communication link.

22. A computer program product operable at a user equipment, comprising:
a non-transitory computer-readable storage medium comprising:
instructions for causing the user equipment to establish a circuit-switched communication link with a core network;
instructions for causing the user equipment to establish a packet-switched communication link with the core network;
instructions for causing the user equipment to receive an indication of an error associated with the packet-switched communication link;
instructions for causing the user equipment to compare a value of a radio access bearer (RAB) re-establishment timer with a predetermined value upon receiving the indication of the error associated with the packet-switched communication link; and
instructions for causing the user equipment, if the value of the RAB re-establishment timer is equal to the predetermined value, in response to the indication of the error, to end a packet-switched data call at the user equipment prior to transmitting a signaling connection release indication message to release the packet-switched communication link, and to maintain the circuit-switched communication link when the packet-switched communication link is released.

23. The computer program product of claim 22, wherein the non-transitory computer-readable storage medium further comprises instructions for causing the user equipment to re-establish the packet-switched communication link while maintaining the circuit-switched communication link.

24. The computer program product of claim 22, wherein the RAB re-establishment timer is a RAB re-establishment timer T314.

25. The computer program product of claim 24, wherein the predetermined value is 0.

26. The computer program product of claim 22, wherein the RAB re-establishment timer is a RAB re-establishment timer T315.

27. The computer program product of claim 26, wherein the predetermined value is 0.

28. The computer program product of claim 22, wherein the non-transitory computer-readable storage medium further comprises:
instructions for causing the user equipment to select as the RAB re-establishment timer a RAB re-establishment timer T314 if the RAB re-establishment timer T314 is configured for the circuit-switched communication link; and
instructions for causing the user equipment to select as the RAB re-establishment timer a RAB re-establishment timer T315 if the RAB re-establishment timer T315 is configured for the circuit-switched communication link.

* * * * *